United States Patent [19]
DiMaggio

[11] Patent Number: 5,682,919
[45] Date of Patent: Nov. 4, 1997

[54] FLOAT CONTROLLED VALVE SHUT-OFF ASSEMBLY

[75] Inventor: Richard Alan DiMaggio, Bakersfield, Calif.

[73] Assignee: American Containment, Inc., Bakersfield, Calif.

[21] Appl. No.: 626,065

[22] Filed: Apr. 1, 1996

[51] Int. Cl.⁶ .............................. F16K 31/18; F16K 33/00
[52] U.S. Cl. ........................ 137/312; 137/421; 137/446; 141/88; 141/198; 251/74; 251/114; 251/116
[58] Field of Search .................... 137/312, 420, 137/421, 434, 442, 443, 444, 446; 141/88, 198; 251/74, 251, 73, 111, 114, 115, 116

[56] References Cited

U.S. PATENT DOCUMENTS

| | | | |
|---|---|---|---|
| 756,397 | 4/1904 | McNamara | 137/421 |
| 846,221 | 3/1907 | Ludewig | 137/421 |
| 897,117 | 8/1908 | Ludewig | 137/421 |
| 1,225,691 | 5/1917 | Williams | 137/420 |
| 1,290,905 | 1/1919 | Callow | 137/420 |
| 2,296,219 | 9/1942 | Miller | 137/421 |
| 2,504,638 | 4/1950 | Browning | 137/420 |
| 2,904,064 | 9/1959 | Davis | 137/421 |
| 3,040,769 | 6/1962 | Lamb | 137/420 |
| 3,363,643 | 1/1968 | Skulski | 137/421 |
| 5,341,857 | 8/1994 | Bravo | 141/88 |

*Primary Examiner*—George L. Walton
*Attorney, Agent, or Firm*—Merek & Voorhees

[57] ABSTRACT

An apparatus for shutting off an impact valve being closeable by a latch bar in response to an accumulation of gasoline within a containment box, the apparatus comprising a cam being rotatable about an axis while displacing the latch bar to a closed position, an actuator arm rigidly coupled to the cam, having a longitudinal section perpendicular to the axis and being rotatable about the axis while rotating the cam, a float pivotally coupled to an end of the longitudinal section being displaceable in response to the accumulation, and a mounting means disposing the actuator arm adjacent the valve.

4 Claims, 2 Drawing Sheets

FLOAT CONTROLLED VALVE SHUT-OFF ASSEMBLY

BACKGROUND OF THE INVENTION

1. Technical Field

The present invention relates to a float controlled assembly for closing impact or shear valves that are used to shut off the flow of gasoline to handling devices, such as gasoline pumps.

2. Background Art

Proper storage and handling of polluting liquids, such as gasoline, has become increasingly important in recent years. In particular, the detection and control of leaks from distribution systems has received attention to prevent hazardous spills and contamination. For example, containment boxes mounted underground under gasoline dispensing pumps have been widely used to contain leaks of gasoline from related supply pipelines. Further, an impact or shear valve is customarily used in the containment box between the pipeline and dispensing unit. The impact valve shuts off the flow of gasoline to the dispensing unit if an emergency occurs, such as an impact with the dispensing unit.

It has been proposed to use an impact valve to shut off in the event of an accumulation of gasoline in the containment box, such as the apparatus disclosed in U.S. Pat. No. 5,431,857 (to Bravo). In the apparatus shown in this patent, a float mechanism raises up when gasoline accumulates in a portion of a containment box and the upward motion is translated to a downward motion that closes the impact valve.

An apparatus of this type, however, requires several modifications to the typical containment box and impact valve. For example, a pit or well is formed in the bottom of the containment box adjacent to a float assembly to amplify the gasoline accumulation. In addition, a bracket is mounted on the floor of the containment box to support a bracket used to transfer the upward movement of a float assembly to a downward motion adjacent to the valve. Further, the valve is modified to connect the valve with a chain that transfer the downward motion to the valve.

Because an apparatus of this type includes components connected to both the containment box and the impact valve, an installation requires significant alignment and adjustment, which can be relatively expensive. In addition, if this type of apparatus were installed on an existing system, the modifications to the containment box and valve would be time consuming and costly.

Thus, it is an object of the invention to provide a valve shut-off assembly that is of a simple construction and composed of only a few components. This object will reduce the cost of this important safety feature for gasoline distribution systems, and simplify maintenance.

Another object of the invention is to provide a valve shut-off assembly that is easy to install on existing containment box and impact valve systems. This will reduce the cost of retrofitting such systems with an apparatus of the invention, thereby making the installation of a safety improvement more attractive.

SUMMARY OF THE INVENTION

An apparatus for shutting off an impact valve being closeable by a latch bar in response to an accumulation of gasoline within a containment box, the apparatus comprising a cam being rotatable about an axis while displacing the latch bar to a closed position, an actuator arm rigidly coupled to the cam, having a longitudinal section perpendicular to the axis and being rotatable about the axis while rotating the cam, a float pivotally coupled to an end of the longitudinal section being displaceable in response to the accumulation, and a mounting means disposing the actuator arm adjacent the valve.

DETAILED DESCRIPTION OF THE PREFERRED EMBODIMENT

Figure 1A:
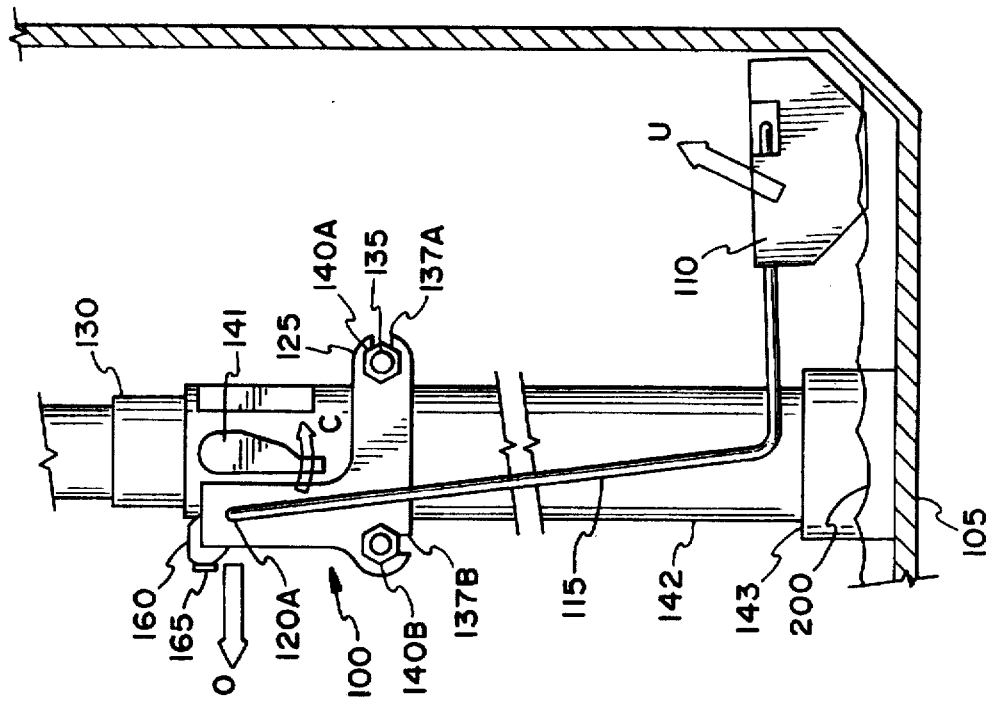
FIG. 1A is a side view of a float controlled valve shut-off assembly of the invention mounted on an impact in a closed position and positioned inside a containment box.
Figure 1:
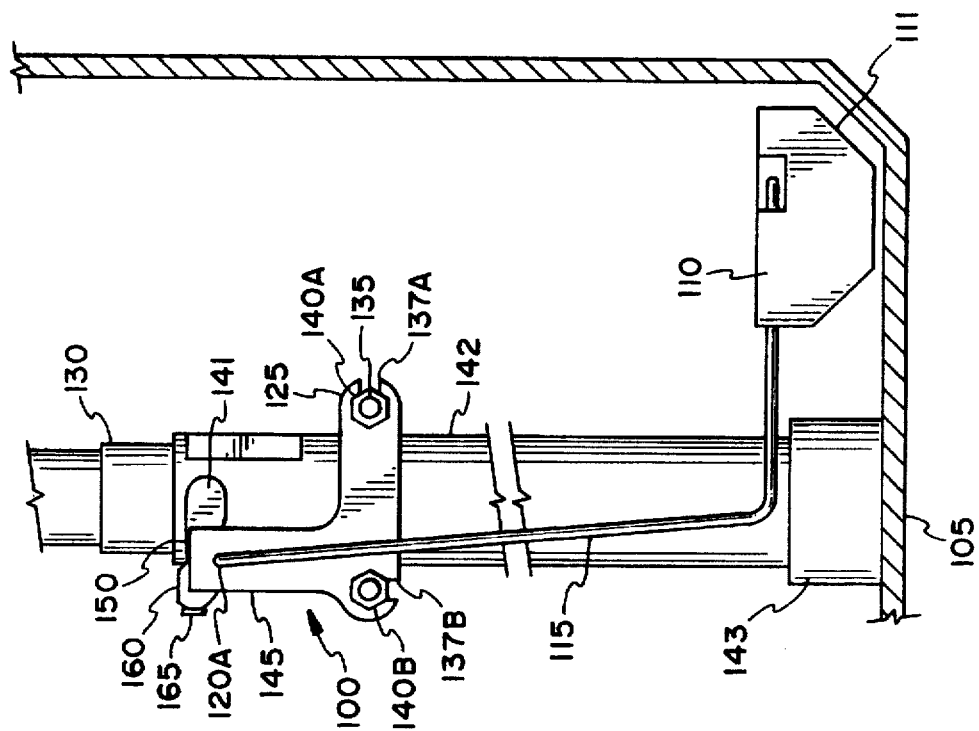
FIG. 1 is a side view of a float controlled valve shut-off assembly of the invention mounted on an impact valve in an open position and positioned inside a containment box.

As shown in FIG. 1, a float controlled valve shut-off assembly 100 of the invention is installed in a containment box 105. A float 110 is pivotally attached to one end of an actuator arm 115 and the other end passes through an aperture 120A in a mounting plate 125. The float 110 may be provided with inclined sides 111 to minimize friction or catching on the sides of the containment box 105 as the float rises up in response to a liquid.

The mounting plate 125 is attached to an impact valve 130 by conventional means, such as a u-bolt 135 engaging apertures 137A and 137B in the plate and affixed with nuts 140A and 140B. A conventional spring loaded trigger 141 is pivotally mounted on the valve 130. Although the trigger 141 is biased in a closed position as shown in FIG. 1A, it is shown in an open position in FIG. 1. The impact valve 130 is connected to a pipe 142, which is connected through a fitting 143 to a supply of gasoline, such as an underground tank (not shown).

A vertical leg 145 of the mounting plate 135 is folded over at a top portion 150 to form a tab 155 (shown in FIG. 2) parallel to the leg 145. A second aperture 120B (shown in FIG. 2) is formed in the tab 155. The actuator arm 115 passes through apertures 120A and 120B, which provide support for the actuator arm, and is fixedly attached to a cam 160 by conventional means such as welding. A latch bar 165 of the impact valve 130 rests against the cam 160, which latch bar acts as a cam follower.

Figure 2:
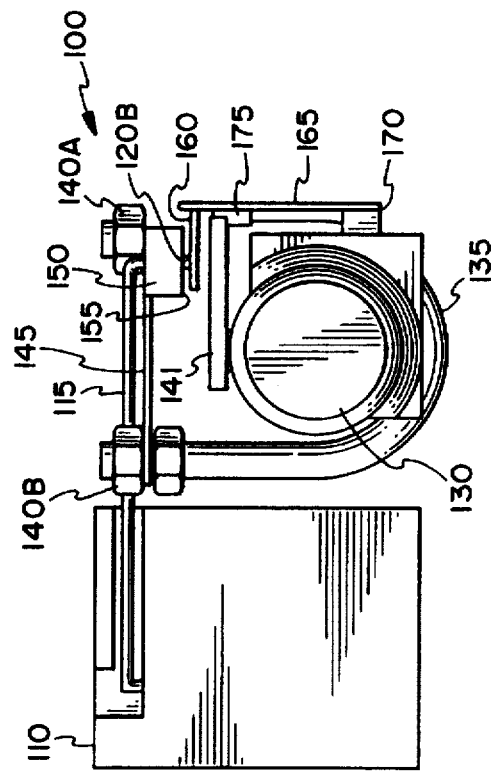
FIG. 2 is a top view of the valve shut-off of the invention mounted on an impact valve.

Additional details of the float controlled valve shut-off assembly 100 are shown in FIG. 2. The latch bar 165 is biased in position that is generally tangential to a radius of the impact valve 130, which position of the latch bar is referred to as an "open" position and is shown in FIG. 2. One end of the latch bar 165 rests against the cam 160 in this open position and the other end 170 is rigidly attached to the valve 130 by conventional means. A trigger catch 175 is mounted or formed on a side of the latch bar 165 facing the impact valve 130. When the latch bar 165 is in the open position, the trigger catch 175 restrains or catches the trigger 141 in an open position.

In conventional use, a physical trauma to the impact valve 130, such as a vehicle impacting a dispensing pump, will jolt the latch bar 165 causing it to move away from the valve. This action will cause the trigger catch 175 to release the trigger 141, which trigger will pivot downwardly closing the impact valve 130 and stopping the flow of gasoline. The float controlled valve shut-off assembly 100 of the invention cooperates with these conventional components, such as the latch bar 165 and trigger 141, and mechanisms to cause the impact valve 130 to close when gasoline collects in the bottom of the containment box 105, which condition indicates a undesirable leak, therefore providing an additional safety feature.

Figure 3:
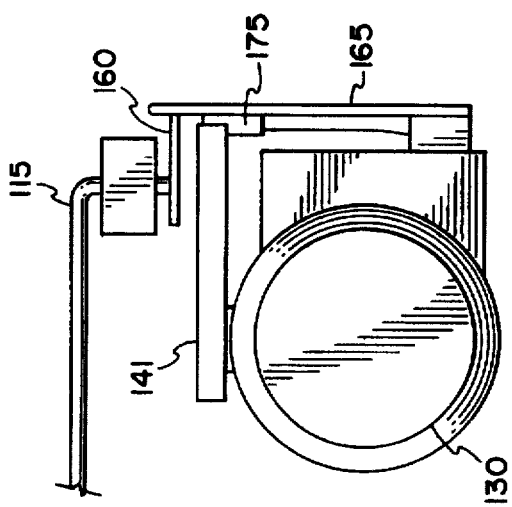
FIG. 3 is a side view of the assembly shown in FIG. 1 wherein gasoline has accumulated in the box and the impact valve is in a closed position.

The operation of the float controlled valve shut-off assembly 100 is shown in FIG. 3. When gasoline or other fluid 200 collects at the bottom of the containment box 105, the float 110 rises in an upward direction shown by the arrow U. This action causes the actuator arm 115 to pivot upwardly and rotate the cam 160. This rotation causes the arcuate shape of the cam 160 to move the latch bar 165 in an outward direction shown by the arrow O, away from the valve 130. This outward movement causes the trigger catch 175 to release the trigger 141 in, which rotates in the direction shown by the arrow C into the closed position and shutting off the flow of gasoline.

The size and curvature of the cam 160 is selected to maintain the latch bar 165 and the trigger 141 in open positions when the float 110 is resting on the bottom of the containment box 105, and to release the trigger to a closed position when the float moves upwardly. For example, when the float 110 is resting on the bottom of the containment box 105, the cam 160 is resting against, but not displacing, the latch bar 165 and the trigger catch 175 is restraining the trigger 141 in an open position. When a liquid enters the containment box 105 by means of a leak, for example in the fitting 143 or pipe 142, and rises to a level deemed to present a hazard, the cam 160 will rotate as described previously. The shape of the cam 160 is selected to push the latch bar 165 outwardly during this rotation by a distance adequate to cause the trigger catch 175 to release the trigger 141, dropping it to the closed position shown in FIG. 3.

Figure 4:
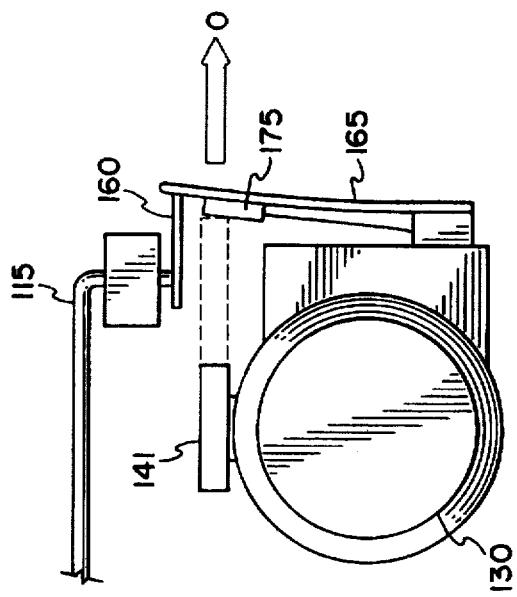
FIG. 4 is a top view of the assembly shown in FIG. 2 wherein the impact valve is in a closed position.

An alternate view of the operation of the float controlled valve shut-off assembly 100 is shown in FIG. 4. When the actuator arm 115 lifts up and rotates the cam 160, the latch bar 165 moves in the outward direction shown by the arrow O. This outward motion releases the trigger 141 which drops from the open position (shown with dotted lines) to the closed position, shutting off the flow of gasoline.

Further, the float controlled valve shut-off assembly of the invention may be easily installed on new or existing impact valves 130. The mounting plate 125 is simply positioned adjacent to the impact valve 130 and the cam 160 is positioned to be close to, or resting on the latch bar 165. The u-bolt 135 is then slid through apertures 137 and secured with nuts 140. The length of actuator arm 115 is selected to position the float 110 at the bottom of the containment box 105 when no liquid is in the box, which length will vary with the size of the box and the position of the impact valve 130 in the box. The size and curvature of the cam 160 is selected to accomplish the objects described previously and depends on the size and relative position of other components, such as the impact valve 130, latch bar 165 and trigger catch 175.

Thus, the float controlled valve shut-off assembly disclosed herein advantageously accomplishes the objects of the invention. The assembly has few moving parts, thereby reducing acquisition cost, installation cost and maintenance costs. Further, the assembly of the invention can easily be retrofitted on existing impact valves and containment boxes because the assembly does not generally require modifications to the impact valves or containment boxes, i.e., it is a "bolt-on" accessory.

Although the present invention has been described with reference to preferred embodiments, workers skilled in the art will recognize that changes may be made in form and detail without departing from the spirit and scope of the invention.

What is claimed:

1. An apparatus for shutting off an impact valve being closeable by a latch bar in response to an accumulation of gasoline within a containment box, the apparatus comprising:

a cam being rotatable about an axis while displacing said latch bar to a closed position;

an actuator arm rigidly coupled to said cam, having a longitudinal section perpendicular to said axis and being rotatable about said axis while rotating said cam;

a float pivotally coupled to an end of said longitudinal section being displaceable in response to the accumulation;

a mounting means disposing said actuator arm adjacent said valve, said mounting meaning comprises a mounting plate having a first actuator arm engaging aperture and mounting apertures;

a u-bolt circumferentially engaging the valve and having threaded ends engaging said mounting apertures; and removable fasteners coupling said u-bolt to said mounting plate.

2. The apparatus of claim 1 wherein said mounting plate further comprises:

a vertical leg having said first actuator arm engaging aperture and a top edge;

a top portion having a leg engaging edge coupled to said top edge, a second edge and disposed generally perpendicular to said vertical leg; and a tab coupled to said second edge and having a second actuator arm engaging aperture positioned coaxially with said first actuator arm engaging aperture.

3. A float controlled assembly for shutting off an impact valve having a closing means in response to an accumulation of gasoline in a containment box, comprising:

a float being displaceable in response to the accumulation;

an actuator arm pivotally coupled at one end to said float and having a perpendicular segment at the other end, said segment having an axis, and being rotatable in response to said float displacement;

a cam rigidly coupled to a distal end of said segment, disposed perpendicular to said axis and being rotatable to activate said closing means;

a mounting means disposing said actuator arm adjacent said valve, said mounting means comprises a mounting plate having a first actuator arm engaging aperture and mounting apertures;

a u-bolt circumferentially engaging the valve and having threaded ends engaging said mounting apertures; and removable fasteners coupling said u-bolt to said mounting plate.

4. The apparatus of claim 3 wherein said mounting plate further comprises:

a vertical leg having said first actuator arm engaging aperture and a top edge;

a top portion having a leg engaging edge coupled to said top edge, a second edge and disposed generally perpendicular to said vertical leg; and a tab coupled to said second edge and having a second actuator arm engaging aperture positioned coaxially with said first actuator arm engaging aperture.

* * * * *